US010325217B2

(12) United States Patent
Singh et al.

(10) Patent No.: US 10,325,217 B2
(45) Date of Patent: Jun. 18, 2019

(54) GENERATING STATE PREDICTIVE METRICS BASED ON MARKOV CHAIN MODEL FROM APPLICATION OPERATIONAL STATE SEQUENCES

(71) Applicant: CA, Inc., New York, NY (US)

(72) Inventors: Satnam Singh, Bangalore (IN); Sanjay Vyas, Fremont, CA (US); Rajendra Arcot Gopalakrishna, Bangalore (IN); Rammohan Varadarajan, Cupertino, CA (US)

(73) Assignee: CA, Inc., New York, NY (US)

( * ) Notice: Subject to any disclaimer, the term of this patent is extended or adjusted under 35 U.S.C. 154(b) by 853 days.

(21) Appl. No.: 14/618,661

(22) Filed: Feb. 10, 2015

(65) Prior Publication Data

US 2016/0232446 A1 Aug. 11, 2016

(51) Int. Cl.
*G06N 7/02* (2006.01)
*G06N 7/04* (2006.01)
*G06N 7/06* (2006.01)
*G06N 7/08* (2006.01)
*G06N 7/00* (2006.01)

(52) U.S. Cl.
CPC .................. *G06N 7/005* (2013.01)

(58) Field of Classification Search
None
See application file for complete search history.

(56) References Cited

U.S. PATENT DOCUMENTS

| 6,457,135 | B1* | 9/2002 | Cooper | G06F 1/14 711/135 |
| 2004/0205445 | A1* | 10/2004 | Xu | H03M 13/2957 714/792 |
| 2004/0260995 | A1* | 12/2004 | Allpress | H03M 13/2975 714/755 |
| 2005/0108322 | A1* | 5/2005 | Kline | G06F 17/30902 709/203 |
| 2007/0033510 | A1* | 2/2007 | Xu | H03M 13/2957 714/796 |
| 2007/0271120 | A1* | 11/2007 | Suresh | G06F 19/327 705/2 |

(Continued)

*Primary Examiner* — Scott A. Waldron
*Assistant Examiner* — Ababacar Seck
(74) *Attorney, Agent, or Firm* — Sage Patent Group

(57) ABSTRACT

An application analysis computer obtains reports from user terminals identifying operational states of instances of an application being processed by the user terminals. Sequences of the operational states that the instances of the application have transitioned through while being processed by the user terminals are identified. Common operational states that occur in a plurality of the sequences are identified. For each of the common operational states, a frequency of occurrence of the common operational state is determined. For each state transition between the common operational states in the sequences, a frequency of occurrence of the state transition is determined. State predictive metrics are generated based on the frequencies of occurrence of the common operational states and the frequencies of occurrence of the state transitions. The state predictive metrics are communicated, such as to an application server to control access to the application by user terminals.

20 Claims, 9 Drawing Sheets

(56) References Cited

U.S. PATENT DOCUMENTS

| | | | |
|---|---|---|---|
| 2009/0210580 A1* | 8/2009 | Bendyk | G06F 13/122 710/32 |
| 2011/0010321 A1* | 1/2011 | Pachet | G06N 99/005 706/12 |
| 2013/0338964 A1* | 12/2013 | Kobayashi | G06F 17/40 702/176 |
| 2014/0258198 A1* | 9/2014 | Spivack | G06N 5/046 706/21 |
| 2014/0281647 A1* | 9/2014 | Bodas | G06F 1/3203 713/340 |
| 2014/0359584 A1* | 12/2014 | Chu | G06F 17/30592 717/131 |
| 2015/0312427 A1* | 10/2015 | Roulland | H04N 1/00344 358/1.15 |

* cited by examiner

| Application Function / Objection | User Triggered Operational Sequence |
|---|---|
| Stock Sale | a -> b -> c -> d -> e ->...-> n |
| Stock Purchase | a -> b -> c -> d -> f -> ... -> n |
| Account balance inquiry | a -> b -> c -> g -> n |
| ⋮ | ⋮ |

GENERATING STATE PREDICTIVE METRICS BASED ON MARKOV CHAIN MODEL FROM APPLICATION OPERATIONAL STATE SEQUENCES

BACKGROUND

The present disclosure relates to computing systems, and, in particular, to management of user terminals, applications, and/or application servers.

Increasingly, users install a myriad of different types of application programs (also commonly referred to as "applications" and "apps") on user terminals having widely varying software and hardware characteristics. For example, users can select from among several million different applications available on various application servers for downloading to cellular telephones (sometimes called "smart phones"), tablet computers, laptop computers, and other types of user terminals for processing. Over a billion Apple IOS user terminals and Android user terminals are presently being used throughout the world.

Mobile analytics is an emerging technology that seeks to measure performance of applications processed by user terminals. Through mobile analytics processes, user terminals can collectively generate millions of performance reports every day for processing by an analysis computer. Analysis of the performance reports can require expensive complex hardware and software resources. Results of the analysis can be difficult for operators to decipher due to the large volume of data contained in the reports and variability introduced by differences in user selections, user defined preferences, and/or user terminal characteristics influencing processing of different application instances.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a computer program product that includes a non-transitory computer readable storage medium including computer readable program code embodied in the medium that when executed by a processor of an application analysis computer causes the processor to perform operations. The operations include obtaining reports from user terminals, where the reports identifying operational states of instances of an application being processed by the user terminals. The operations further include identifying sequences of the operational states that the instances of the application have transitioned through while being processed by the user terminals, and identifying common operational states that occur in a plurality of the sequences. The operations further include, for each of the common operational states, determining a frequency of occurrence of the common operational state. The operations further include, for each state transition between the common operational states in the sequences, determining a frequency of occurrence of the state transition. State predictive metrics are generated based on the frequencies of occurrence of the common operational states and the frequencies of occurrence of the state transitions, and the state predictive metrics are communicated, such as to an application server.

In some further embodiments, the state predictive metrics are generated based on determining state probabilities based on the frequencies of occurrence of the common operational states, determining state transition probabilities based on the frequencies of occurrence of the state transitions, and generating the state predictive metrics based on the state probabilities and the state transition probabilities.

Some other embodiments of the present disclosure are directed to a method of performing operations on a processor of an application analysis computer. The operations include obtaining reports from user terminals, where the reports identifying operational states of instances of an application being processed by the user terminals. The operations further include identifying sequences of the operational states that the instances of the application have transitioned through while being processed by the user terminals, and identifying common operational states that occur in a plurality of the sequences. The operations further include, for each of the common operational states, determining a frequency of occurrence of the common operational state. The operations further include, for each state transition between the common operational states in the sequences, determining a frequency of occurrence of the state transition. State predictive metrics are generated based on the frequencies of occurrence of the common operational states and the frequencies of occurrence of the state transitions, and the state predictive metrics are communicated, such as to an application server.

Other computer program products, methods, and systems according to embodiments of the present disclosure will be or become apparent to one with skill in the art upon review of the following drawings and detailed description. It is intended that all such additional computer program products, methods, and systems be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are directed to improved processes for generating metrics for applications processed by user terminals based on reports from the user terminals that identify operational states of instances of an application being processed by the user terminals. Although the operation of instances of a same application being processed by different user terminals can be affected by a myriad of factors, including differences in user selections, user defined preferences, and/or user terminal characteristics, various embodiments disclosed herein may operate to generate and organize state predictive metrics by less computationally intensive operations and/or using reduced complexity hardware and software resources. The state predictive metrics themselves or other information derived therefrom may also be more intuitive for a human operator to understand.

In some embodiments, user terminals provide reports identifying operational states of instances of an application being processed by the user terminals. Sequences of the operational states are identified which the instances of the application have transitioned through while being processed by the user terminals. Frequency of occurrence of each of the operational states is determined. Frequency of occurrence of state transitions between the operational states in the sequences is determined. State predictive metrics are generated based on the frequencies of occurrence of the operational states and the frequencies of occurrence of the state transitions. The frequency of operational states and frequency of state transitions can be modeled by a Markov chain model which can be analyzed using a Viterbi algorithm to identify the probability of an optimal sequence occurring. The optimal sequence may be defined based on achieving a defined business objective.

Figure 1:
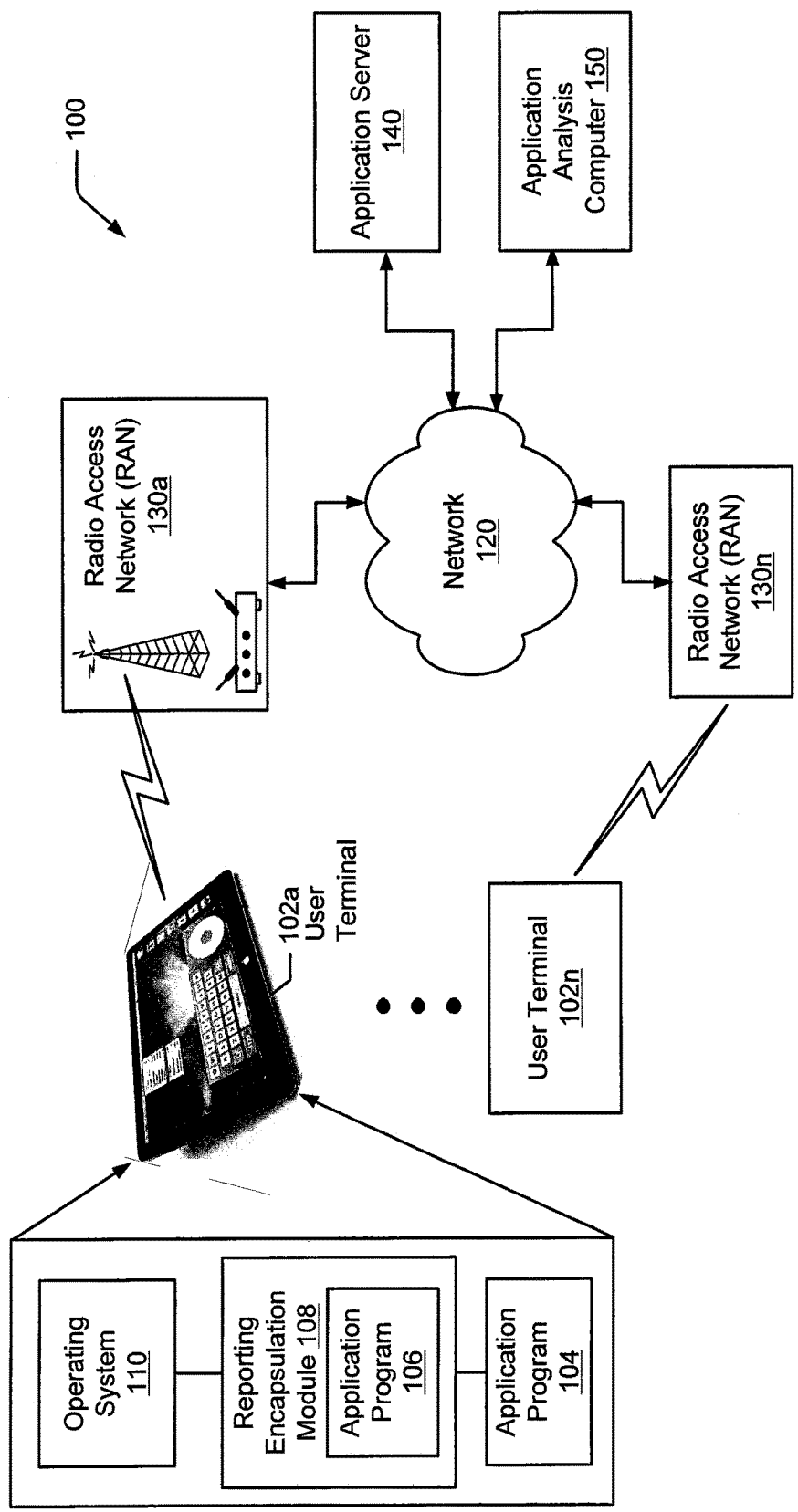
FIG. 1 is a block diagram of a system for generating state predictive metrics based on state transition probabilities observed in reports from user terminals, in accordance with some embodiments of the present disclosure.

FIG. 1 is a block diagram of a system 100 for generating state predictive metrics for applications processed by user terminals using reports from the user terminals which identify operational states of instances of an application being processed by the user terminals, in accordance with some embodiments of the present disclosure. The system 100 includes an application analysis computer 150 which receives reports from user terminals 102a-n through wireless network communications (e.g., radio access networks (RAN) 130a-130n) and/or wired network communications via a data network 120. The data network 120 may be a private network and/or a public network such as the Internet. One or more of the user terminals 102a-102n may communicate through the radio access networks 130a-130n using one or more wireless communication protocols that may include, but are not limited to, 3GPP Long Term Evolution (LTE), WLAN (IEEE 802.11), WiMax, Bluetooth, etc.

The user terminals 102a-102n can download application programs from the application server 140. The application server 140 may, for example, include an Apple application store server (e.g., iTunes), an Android application store server (e.g., Google Play and/or Amazon Appstore), and/or a Window application store server (e.g., Microsoft Windows Store). Although the application analysis computer 150 has been illustrated as being separate from the application server 140, some or all of the functionality of the application analysis computer 150 disclosed herein may be combined with the application server 140 or another computer node ("network node") communicatively connected to the network 120.

The application programs may include gaming programs, spreadsheet programs, multimedia programs, word processing programs, database programs, presentation programs, etc. The application programs may be selected from among several million different applications available from application servers for downloading to many different types of user terminals. The user terminals 102a-102n may include cellular telephones (sometimes called "smart phones"), tablet computers, laptop computers, and other types of electronic communication devices configured for processing applications.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein. For example, embodiments of the present disclosure may be used to generate state predictive metrics from reports received from millions of user terminals processing instances of one or more types of applications.

Each of the user terminals 102a-102n (individually referred to as "user terminal 102") may include an reporting encapsulation module 108 that operates to generate reports identifying operational states of instances of an application program 106 ("application") being processed by a processor of the user terminal 102. The reporting encapsulation module 108 may "wrap around" the application program 106 to intercept or otherwise observe application programming interface (API) calls from the application program 106 to other application programs 104 processed by the user terminal 102, an operating system 110 processed by the user terminal 102, and/or other software/hardware resources of the user terminal 102. The reporting encapsulation module 108 may similarly intercept or otherwise observe API calls from the other application programs 104 to the application program 106.

As used herein, an "API call" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API calls.

Application programs, such as mobile application programs, are written to provide functionality that satisfies defined business objectives of the developer. For example, a stock brokerage mobile application can provide various different functionalities which enable users to operate a user terminal to check balances of multiple accounts, deposit funds into a defined account, transfer funds between accounts, trade stocks, trade bonds, trade mutual funds, update account owner contact information, locate local offices of the brokerage, etc. Different functions can be selectively performed responsive to different user selections among menu items and/or data input by a user via a user input interface of the user terminal. The different functions may additionally or alternatively be selectively performed responsive to data received from another application processed by the user terminal and/or data received from a network node (e.g., a network server that communicates with the application program).

Each different function or objective of the application has a different sequence of operational states that the application transitions through while being processed to perform the defined function or objection.

Figures 2A, 2B:
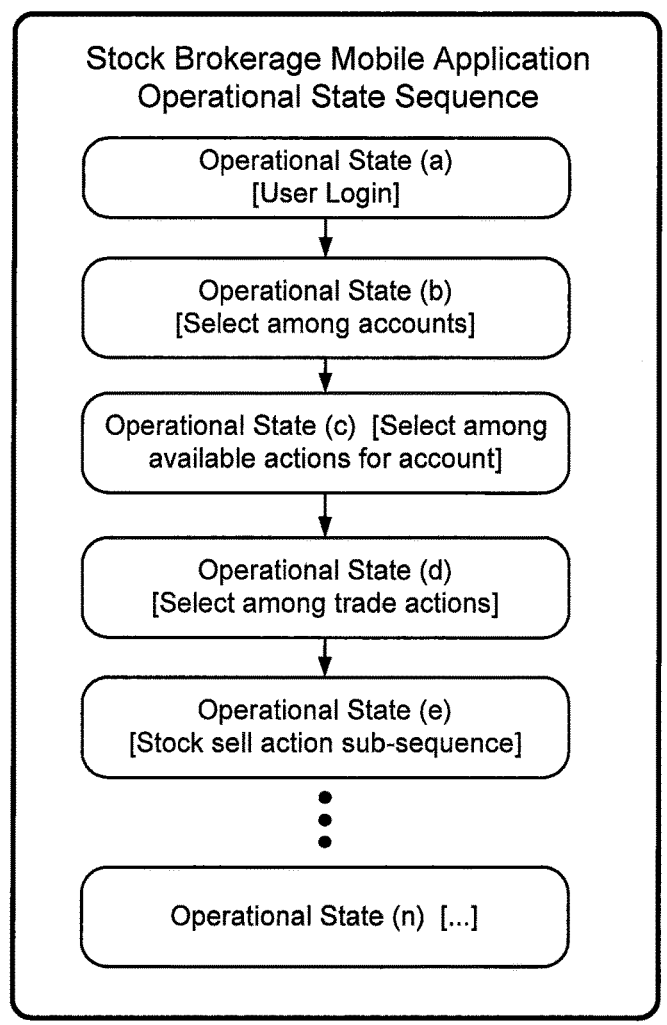
FIGS. 2a-2b illustrate sequences of operational states by an example stock brokerage mobile application responsive to different sequences of user selections.

FIG. 2a illustrates an example sequence of operational states of a stock brokerage mobile application that is performed for the function of selling a stock from a particular user account. Referring to FIG. 2a, a user login process is provided during operational state (a). Processing then proceeds to operational state (b) where account information is presented to a user and the user can select among registered accounts. Responsive to a user selection of an account, processing then proceeds to operational state (c) where the user is presented with available actions that can be performed on the selected account. Responsive to user selection of a trade action, processing then proceeds to operational state (d) where the user is presented with available trading actions (e.g., buy or sell, user-defined transaction information, etc.) that can be performed. Responsive to the user selecting to sell a stock and providing required transaction information, processing then proceeds to operational state (e) where the application communicates with a stock trade execution network node to perform the requested stock sale. Processing then proceeds through one or more further defined operational states (n), which may loop back to one or more of the prior operational states and/or proceed to other operational states.

Each other function provided by the stock brokerage mobile application has other respective sequences of operational states that the application transitions through to provide the respective function. FIG. 2b illustrates a table listing some functions that can be provided by the stock brokerage mobile application and the corresponding sequence of operational states that occurs while the application is being processed to provide the respective function. Referring to FIG. 2b, a stock purchase function has a similar initial set of processing states as the a stock sale function (i.e., state "a" for user login, state "b" for displaying user accounts, state "c" for receiving user selection of particular account, but differs by state "f" which performs the stock purchase using funds from the identified user account. An account balance inquiry function has the same first three states (i.e., state "a", state "b", state "c") but then performs other state "g" to display account balance. Other states can be included in the various sequences, with the sequences illustrates an end state "n" which may function to log-off a user's access to the account.

A mobile application may have a tremendous number of different types of operational states in which it can operate and may have a tremendous number of different types of events that trigger transition from one operational state to another operational state. The events may include receiving a command and/or data from a user that satisfies rules, receiving commands and/or data from another application, receiving commands and/or data from a networked computer resource, etc. For example, the operational state (b) of FIGS. 2a-2b may include many sub-states which are performed to obtain a list of the user's accounts, obtain descriptive information for each account, and display the list and information to the user. Consequently, a tremendous number of different sequences of operational states can be observed during processing of instances of an application by many different user terminals.

Moreover, during processing of some instances of the stock brokerage mobile application a sequence of operational states may be terminated before reaching a designated end state (e.g., operational state (n)), such as due to a user terminating execution of the application, occurrence of communication failure with a necessary network node (e.g., the brokerage account server, the stock trade execution network node, etc.), a software and/or hardware error within the user terminal, etc.

The stock brokerage mobile application is configured to report its operational states, e.g., via the reporting encapsulation module 108, to the application analysis computer 150. The application analysis computer 150 receives the reports identifying various operational states of instances of the stock brokerage mobile application that are being processed by, for example, thousands or millions of different user terminals 102. In accordance with some embodiments, the application analysis computer 150 utilizes reported operational states to identify frequency of occurrence of various sequences of operational states, identify sequences of operational states that satisfy a defined efficiency rule, predict likelihood of occurrence of various observed operational states and/or sequences of operational states, and identify a sequence of operational states that may provide one or more defined improvements in efficiency for obtaining a defined objective (e.g., reducing the number of user inquiries required to perform the defined objective, reducing the amount of processor bandwidth utilization to perform the defined objective, reducing the amount of memory utilization to perform the defined objective, and/or reducing the amount of network traffic bandwidth utilization to perform the defined objective).

Some embodiments of the application analysis computer 150 may model the observed operational states and sequences of operational states using a Markov chain model to track and predict sequences of operational states of instances of the application programmer processed by user terminals. The Markov chain model can be used to predict or forecast occurrence of individual operational states and sequences of operational states for a defined application. Moreover the Markov chain model in combination with a Viterbi algorithm may be used to predict the most likely sequence of operational states that will be performed for a defined function and/or identify an optimal sequence of operational states to perform the defined function.

Figure 3A:
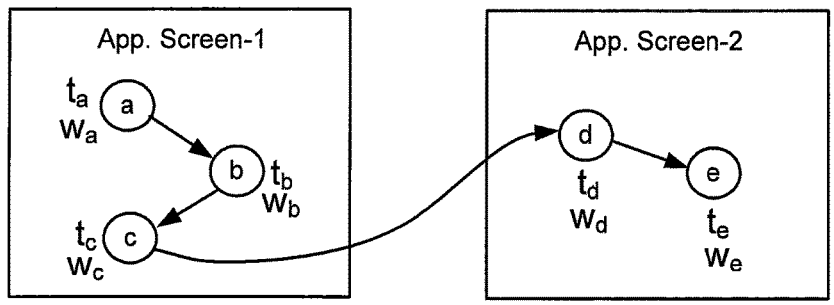
FIG. 3a illustrates a sequence of operational states transitioned through during processing by a user terminal of user commands received through two user-interface screens displayed for an application, in accordance with some embodiments of the present disclosure.

FIG. 3a illustrates a sequence of operational states transitioned through during processing by a user terminal of user commands received through two application screens ("Screen-1" and "Screen-2"), in accordance with some embodiments of the present disclosure. Processing of the application follows a sequence of operational states that can include (a), (b), (c), (d), and (e). The application analysis computer 150 obtains reports from the user terminal which identify the operational states of the instance of the application being processed by the user terminal. The reports may include indications of time durations during which the instances of the application remained within the various reported operational states. For example, the reports can indicate that the application instance remained in operational state (a) for a time duration $t_a$, remained in operational state (b) for a time duration $t_b$, remained in operational state (c) for a time duration $t_c$, remained in operational state (d) for a time duration $t_d$, and remained in operational state (e) for a time duration $t_e$.

The application analysis computer 150 may obtain weight values that have been assigned to the operational states. In the example of FIG. 3a, weights Wa through We respectively correspond to operational states (a) through (e). The weight values may be obtained by querying a repository containing weight values of operational states of a plurality of applications using an identifier for the application to obtain the weight values for the operational states (a)-(e) of the application. Alternatively or additionally, the weight values may be defined by an operator and/or may be stored within or generated by the user terminal and provided as content of the respective reports to the application analysis computer 150.

Figure 3B:
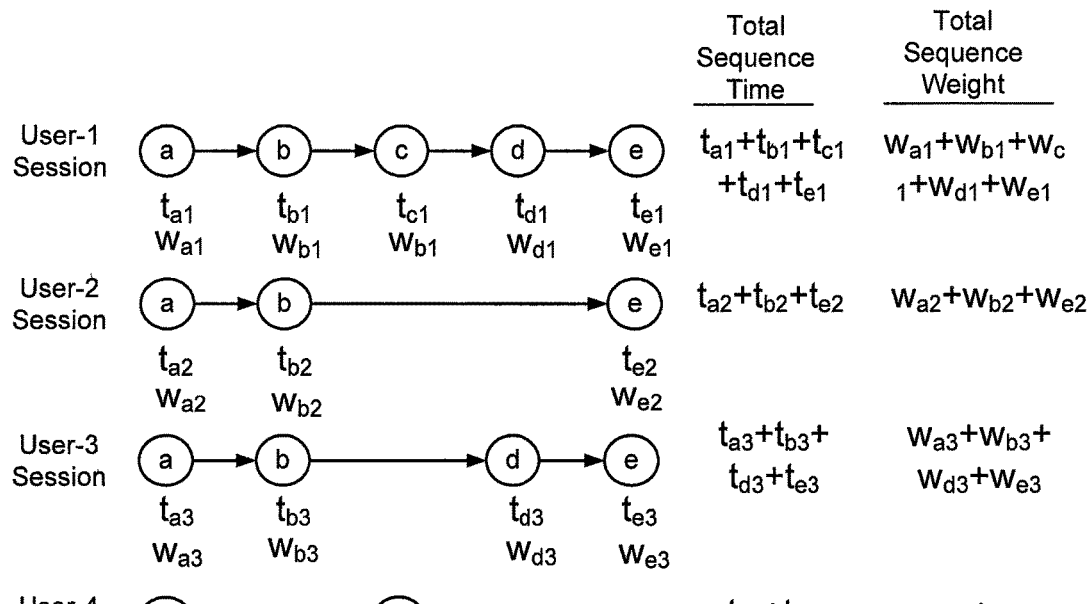
FIG. 3b illustrates sequences of operational states observed in reports from user terminals during processing of five different instances of the application of FIG. 3a and the probability, time, and weight metrics generated therefrom, in accordance with some embodiments of the present disclosure.
Figure 6A:
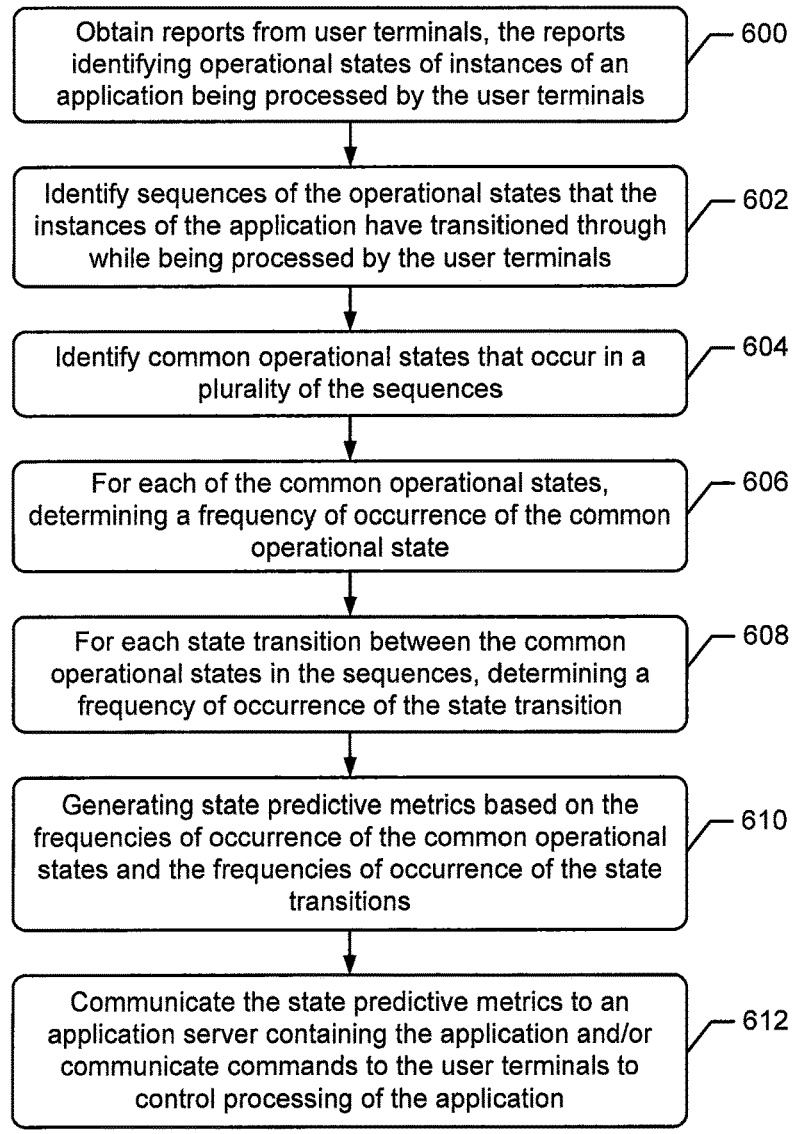

FIG. 3b illustrates sequences of operational states received in reports from user terminals during processing of five different instances of the application of FIG. 3a, and further illustrates the probability, time, and weight metrics generated therefrom. FIG. 6a illustrates a flowchart of operations that may be performed by the application analysis computer 150 to generate state predictive metrics in accordance with some embodiments of the present disclosure.

Each of the user sessions may correspond to reports received from application instances processed by five different user terminals, reports received from application instances processing data of five different user accounts, reports received from application instances corresponding to five different communication session identifiers, etc. Although the example of FIG. 3b includes only five user sessions, the operations and methods disclosed herein may be applied to any number of user sessions.

Each report may identify a single operational state of an instance of an application being processed by one of the user terminals, or may identify a plurality of operational states that the instance of the application has resided within while being processed. Moreover, when a plurality of operational states are indicated by a report, the report may further indicate a sequential order in which the operational states have occurred or provide other data from which the sequence may be determined by the application analysis computer 150.

Referring to FIGS. 3b and 6, the application analysis computer 150 obtains (block 600) reports from user terminals. The reports identify operational states of instances of the application being processed by the user terminals. The application analysis computer 150 identifies (block 602) sequences of the operational states that the instances of the application have transitioned through while being processed by the user terminals. The sequences may be identified by the reports or may be determined from order of reports associated with a same user session, etc. For example, five different operational state sequences have been identified for five different instances of the application being processed by user terminals (i.e., "User-1 Session", "User-2 Session", "User-3 Session", "User-4 Session", "User-5 Session").

Common operational states that occur in a plurality of the sequences are identified (block 604), as operational states (a)-(e). In the example of FIG. 3b, the application instance for "User-1 session" transitions through each of states (a)-(e). In contrast, the application instance for "User-2 session" transitions from state (a) to (b) and then transitions directly to state (e). The application instance for "User-3 session" transitions from state (a) to (b) and then transitions directly to state (d) and then to state (e). As explained above, differences in the operational state sequences identified in the reports for the different user sessions may be due to, for example, different user selections among user selectable menu items, user defined settings residing in the user terminal or elsewhere, and/or data received from an external network node and/or from another application concurrently processed by the user terminal.

When identifying sequences of the operational states that the instances of the application have transitioned through while being processed by the user terminals 102, the application analysis computer 150 may identify a subset of the reports containing a same session identifier, and assemble a sequence of the operational states from the subset of the reports. The subset of the reports may be identified, for example, based on those reports containing a session identifier associated with a same user account.

The application instance for "User-4 session" transitions directly from state (a) to (c) where processing of the application instance is terminated due to, for example, user termination of application processing, occurrence of a processing error, and/or unavailability of necessary data from a network computer node (e.g., application server). Similarly, the application instance for "User-4 session" transitions from state (a) to (b) where processing of the application instance is terminated due to, for example, user termination of application processing, occurrence of a processing error, and/or unavailability of necessary data from a network computer node.

The application analysis computer 150 determines (block 606), for each of the common operational states, a frequency of occurrence of the common operational state. The application analysis computer 150 also determines (block 608), for each state transition between the common operational states in the sequences, determining a frequency of occurrence of the state transition. State predictive metrics are generated (block 610) based on the frequencies of occurrence of the common operational states and the frequencies of occurrence of the state transitions. The application analysis computer 150 communicates (block 612) the state predictive metrics to memory for storage, to another application concurrently processed by the user terminal, and/or to a network computer node. For example, as described in further detail below with regard to FIG. 10, the application analysis computer 150 may communicate the state predictive metrics to the application server 140 containing the application and/or may communicate commands to the user terminals 102 to control processing of the application.

The application analysis computer 150 may compare the frequency of occurrence of the states and state transitions for the various sequences to identify one of the sequences that satisfies a defined rule, and output the identified sequence in a notification to a user (e.g., application owner) and/or in a message to a network node (e.g., application server 140), and/or use the identified sequence to generate a command to control execution of the application by the user terminals 102. The application analysis computer 150 may rank the sequences of the operational states (e.g., sort sequences to form a sorted list, assign a numeric ranking value to each sequence, etc.) based on the frequency of occurrence of the states and/or the frequency of occurrence of the state transitions of the various sequences. The ranked sequences may be output to an user (e.g., application owner) and/or a network node (e.g., the application server 140), and/or may be used to generate a command to control execution of the application by the user terminals 102. A user or computer program configured by a user may utilize the reported frequency of occurrence of the states and/or the state transitions to identify desirable operational sequences, and the application may be modified or controlled based on the identification of the desirable operational sequences.

Figure 6B:
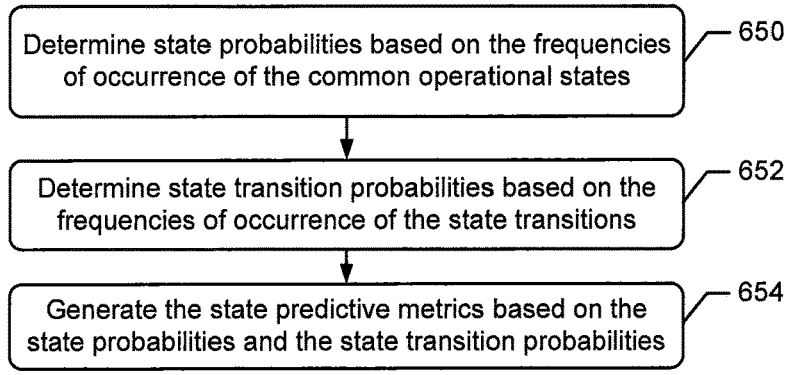

FIG. 6b illustrates a flowchart of further example operations that may be performed by the application analysis computer 150 to generate the state predictive metrics. Referring to FIG. 6b, state probabilities are determined (block 650) based on the frequencies of occurrence of the common operational states. State transition probabilities are determined (block 652) based on the frequencies of occurrence of the state transitions. The state predictive metrics are generated (block 654) based on the state probabilities and the state transition probabilities.

Figure 4:
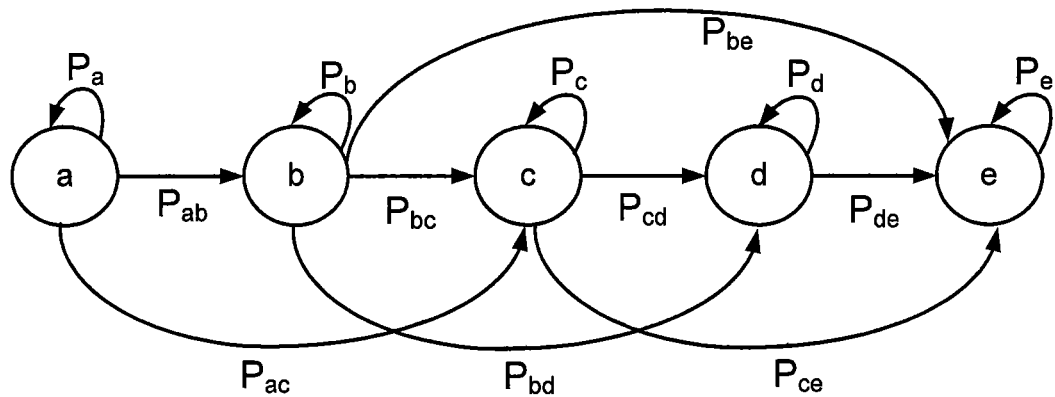
FIG. 4 illustrates an operational state transition diagram with probabilities that are generated based on reports from user terminals processing the application of FIG. 3a, in accordance with some embodiments of the present disclosure.

FIG. 4 illustrates an operational state transition diagram with probabilities that are generated based on reports from user terminals processing the application of FIG. 3a, in accordance with some embodiments of the present disclosure. In the example of FIG. 4, each possible transition between states and from any state to itself is indicated by the lined arrows, with the corresponding probability indicated by the variable "P". For example, the state transition probability of the application instance transitioning from operational state (a) directly to the operational state (b) is indicated as Pab, while the state transition probability of the application instance transitioning from operational state (a) directly to the operational state (c) is indicated as Pac, and so on. Similarly, the state probability of application instance transitioning from operational state (a) back to itself is indicated as Pa. Similarly, the state probability of application instance transitioning from operational state (b) back to itself is indicated as Pb.

Respective ones of the state probabilities are determined based on the frequency of occurrence of the respective operational state identified by the reports. Respective ones of the state transition probabilities are determined based on the frequencies of occurrence of the respective state transitions identified by the reports.

For example, to determine the state transition probabilities, the application analysis computer 150 may identify, for each of the operational states, any other operational states that are subsequently transitioned to from the operational state and count occurrences of transitions from the operational state to each of the any other operational states. Thus for example, the application analysis computer 150 can process content of each of the reports to count transitions of the application instance from operational state (a) to (b), count transitions of the application instance from operational state (a) to (c), count transitions of the application instance from operational state (a) to (d), count transitions of the application instances from operational state (a) to (d), and so on for each other possible transition between each of the other operational states. The application analysis computer 150 can similarly count transitions of the application instances from selected other ones of the operational states to themselves (i.e., state (a) to itself) to determine the respective state probabilities. The analysis computer 150 can then determine the state transition probabilities and the state probabilities based on the counted occurrences over a defined time interval (i.e., frequency).

A state probability, Px, may be determined based on the following equation:

$$Px=(Nx+1)/(\Sigma_i(Ni+1)),$$

where Px is the statistical probability of transitioning back to the same state x, Nx is the number of occurrences of state x, and Ni is the number of occurrences of each state (i) in the sequence.

A state transition probability, Pxy, may be determined based on the following equation:

$$Pxy=((\text{number of transitions from state } x \text{ to state } y)+1)/((\text{number of occurrences of state } x)+ (\text{number of distinct states in the sequence})),$$

where Pxy is the statistical probability of transitioning from state x to state y.

With continued reference to FIG. 4, the conditional probability of a transition can be determined based on the following equation:

$$Pab=Pr(b(a))=(\text{number of occurrences of } b \text{ given previous state is } a+1)/(\text{number of occurrences of } a+(\text{number of distinct states in the sequence})).$$

The probability Pr of a defined sequence, e.g., abcde, can be determined based on the following equation:

$$Pr(abcde)=Pr(a)Pr(b|a)Pr(c|b)Pr(d|c)Pr(e|d).$$

Similarly, the probability Pr of another defined sequence abde can be determined based on the following equation:

$$Pr(acde)=Pr(a)Pr(c|a)Pr(d|c)Pr(e|d).$$

The percent completion of a business objective can be determined based on determining the probability of a sequence multiplied by the total weight of the sequence.

Figure 9:
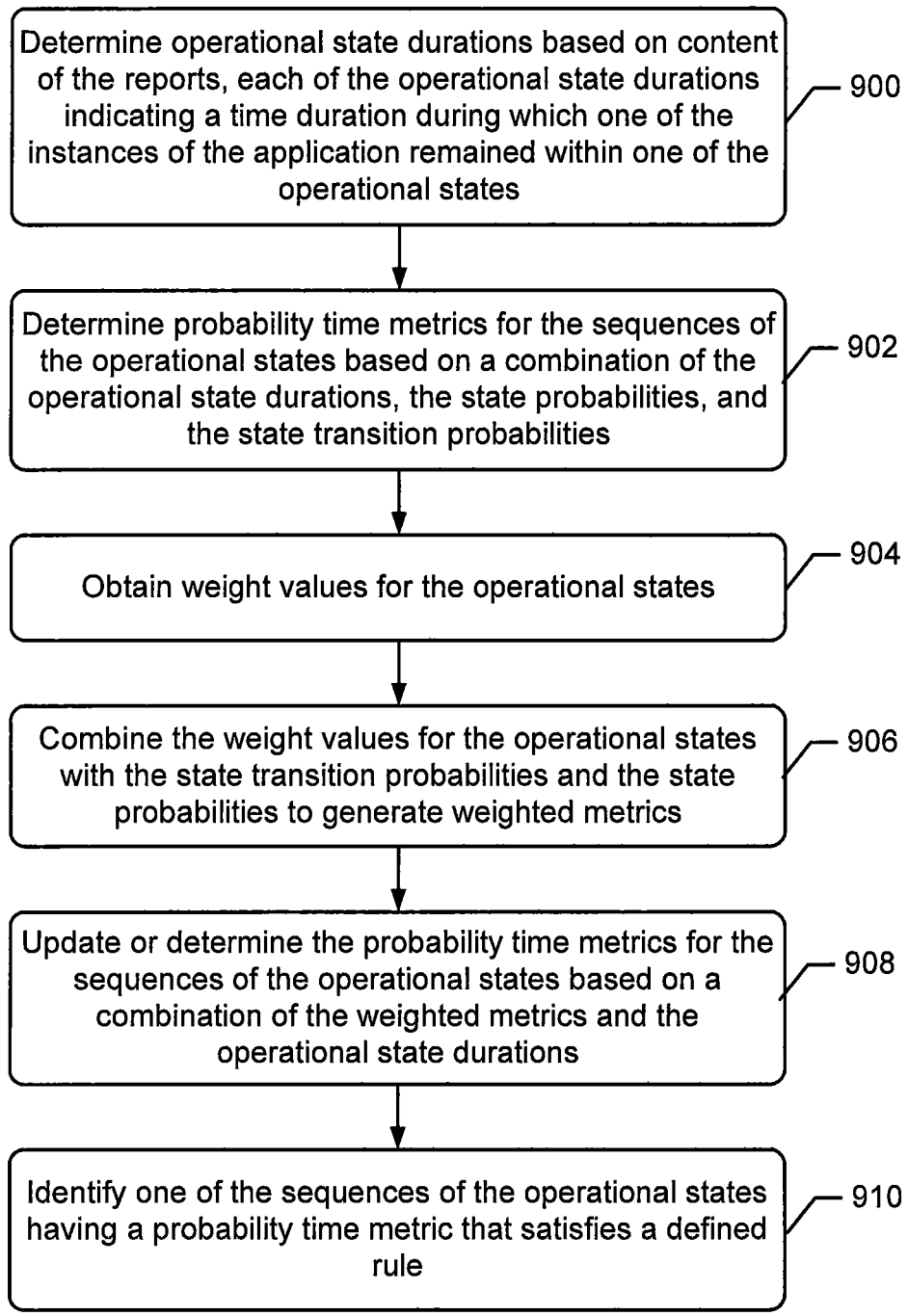

FIG. 9 is a flowchart of operations that may be performed by the application analysis computer 150. Referring to FIGS. 3b and 9, the application analysis computer 150 can determine (block 900) operational state durations based on content of the reports. As explained above, each report may include information indicating a time duration during which processing of the application instance remained in an identified operational state. Accordingly, each of the operational state durations can indicate a time duration during which one of the instances of the application remained within one of the operational states.

As shown in FIG. 3b, the total sequence time for one of the sequences can be determined by summing the individual time durations of each operational state in the sequence. For example, the total sequence time for User-1 session is determined as "$t_{a1}+t_{b1}+t_{c1}+t_{d1}+t_{e1}$", where:

$t_{a1}$ is the time duration of operational state (a) when processed during User-1 session;

$t_{b1}$ is the time duration of operational state (b) when processed during User-1 session;

$t_{c1}$ is the time duration of operational state (c) when processed during User-1 session;

$t_{d1}$ is the time duration of operational state (d) when processed during User-1 session; and $t_{e1}$ is the time duration of operational state (e) when processed during User-1 session.

Similarly, the total sequence time for User-2 session is determined as "$t_{a2}+t_{b2}+t_{e2}$", where $t_{a2}$ is the time duration of operational state (a) when processed during User-2 session, and so on for the other time duration values provided for User-2 session. The total sequence times for the other sessions are similarly determined using the corresponding equations shown in FIG. 3b.

The application analysis computer 150 may compare the total sequence times for the various sequences to identify one of the sequences of the operational states having a total sequence time that satisfies a defined rule, and output the identified sequence to the application server 140 and/or use the identified sequence to generate a command to control execution of the application by the user terminals 102. For example, when an application sequence is determined to have an excessive total sequence time, which may correspond to the application consuming excessive processing resources and/or incurring an excessive processing delay, a developer of the application may be provided an alert notification that identifies the application and sequence. A command may be sent to the user terminals 102 to disable application execution and/or to disable or modify operation of a feature of the application to avoid the operational state sequence that was identified. A message may be sent to the application server 140 to disable downloading of the application to user terminals 102 and/or to disable or modify operation of a feature of the application to avoid the operational state sequence that was identified.

Alternatively or additionally, the application analysis computer 150 may rank the sequences of the operational states (e.g., sort sequences to form a sorted list, assign a numeric ranking value to each sequence, etc.) based on the total sequence times. The ranked sequences may be output to the application server 140 and/or may be used to generate a command to control execution of the application by the user terminals 102.

The total sequence times may be weighted based on the total sequence weights to generate metrics for the respective sequences of operational states. The total sequence times and/or the total sequence weights may be combined with the state probabilities, and the state transition probabilities to generate metrics for the respective sequences of operational states. The application analysis computer 150 may rank the sequences of the operational states (e.g., sort sequences to form a sorted list, assign a numeric ranking value to each sequence, etc.) based on such metrics. The ranked sequences may be output to the application server 140 and/or may be used to generate a command to control execution of the application by the user terminals 102.

By way of further example, the application analysis computer 150 can generate state predictive metrics based on the operational state durations, the state probabilities, and the state transition probabilities. The generation of state predictive metrics may include determining (block 902 of FIG. 9) probability time metrics for the sequences of the operational states based on a combination of the operational state durations, the state probabilities, and the state transition probabilities, and generating the state predictive metrics based on the probability time metrics.

As explained above, the application analysis computer 150 can obtain (block 906) weight values for the operational states. As shown in FIG. 3b, the total sequence weight for one of the sequences can be determined by summing the individual weights of each operational state in the sequence. For example, the total sequence weight for User-1 session is determined as "$W_{a1}+W_{b1}+W_{c1}+W_{d1}+W_{e1}$", where:

$W_{a1}$ is the weight associated with operational state (a) when processed during User-1 session;

$W_{b1}$ is the weight associated with operational state (b) when processed during User-1 session;

$W_{c1}$ is the weight associated with operational state (c) when processed during User-1 session;

$W_{c1}$ is the weight associated with operational state (d) when processed during User-1 session; and $W_{e1}$ is the weight associated with operational state (e) when processed during User-1 session.

Similarly, the total sequence weight for User-2 session is determined as "$W_{a2}+W_{b2}+W_{e2}$", where $W_{a2}$ is the weight associated with operational state (a) when processed during User-2 session, and so on for the other weights provided for User-2 session. The total sequence weights for the other sessions are similarly determined using the corresponding equations shown in FIG. 3b.

The weight values for the operational states can be combined (block 906) with the state transition probabilities and the state probabilities to generate weighted metrics. The probability time metrics for the sequences of the operational states can be updated or determined (block 908) based on a combination of the weighted metrics and the operational state durations. One of the sequences of the operational states having a probability time metric that satisfies a defined rule can be identified (block 910).

The application analysis computer 150 may compare the total sequence weights for the various sequences to identify one of the sequences of the operational states having a total sequence weight that satisfies a defined rule, and output the identified sequence to the application server 140 and/or use the identified sequence to generate a command to control execution of the application by the user terminals 102. For example, when an application sequence is determined to have an excessive total sequence weight a developer of the application may be provided an alert notification that identifies the application and sequence. A command may be sent to the user terminals 102 to disable application execution and/or to disable or modify operation of a feature of the application to avoid the operational state sequence that was identified. A message may be sent to the application server 140 to disable downloading of the application to user terminals 102 and/or to disable or modify operation of a feature of the application to avoid the operational state sequence that was identified.

The application analysis computer 150 may use the total sequence time and/or the total sequence weight, which may be averaged or otherwise generated from a defined numerical combination over the user sessions, to identify sequences of operational states that satisfy a defined efficiency rule, predict likelihood of occurrence of various observed operational states and/or sequences of operational states, and identify a sequence of operational states that may provide one or more defined improvements in efficiency for obtaining an objective. The defined improvements in efficiency which may be managed, in part, using the total sequence time and/or the total sequence weight may include reducing the number of user inquiries required to perform the defined objective, reducing the amount of processor bandwidth utilization to perform the defined objective, reducing the amount of memory utilization to perform the defined objective, and/or reducing the amount of network traffic bandwidth utilization to perform the defined objective.

Figure 8:
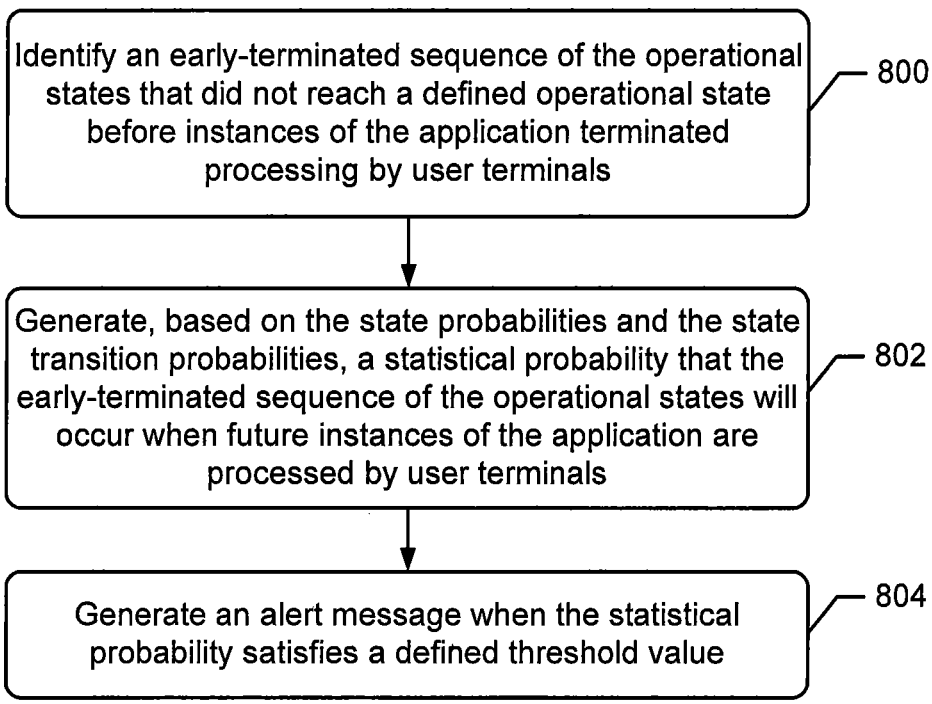

Referring to the flowchart of operations shown in FIG. 8, the application analysis computer 150 may identify (block 800) an early-terminated sequence of the operational states that did not reach a defined operational state before instances of the application terminated processing by the user terminals 102. For example, the operational state sequences shown in FIG. 3b for User-4 session and User-5 session can be identified as early-terminated sequences based on their not reaching operational state (e) before termination. The application analysis computer 150 generates (block 802), based on the state probabilities and the state transition probabilities, a statistical probability that the early-terminated sequence of the operational states will occur when further instances of the application processed by the user terminals 102. An alert message can be generated (block 804) when the statistical probability satisfies a defined threshold value. The alert message may be communicated to the application server 140 and/or may be used to control processing of the application by the user terminals 102.

The weight value of at last one of the operational states in the early-terminated sequence can be modified based on the identification of the early-terminated sequence. For example, weight values for operational states (c) and (b), $W_{c4}$ and $W_{b5}$, can be modified (e.g., increased) based on a number of times that operations are observed to have been terminated while residing in those states. Accordingly, the application analysis computer 150 may modify the weights of one or more states which have been identified as potentially having problematic operations, such as causing processing errors or influencing users to terminate operation of the program. The weights may be modified to highlight those operational states as being possibly problematic in reported communications to the application server 140 and/or in processes that use the weights to control processing of application by the user terminals 102.

A command may be sent to the user terminals 102 to disable or modify operation of a feature of the application to avoid occurrence of the early-terminated operational state sequence and/or avoid or reduce the likelihood of the application instance residing in the operational state that has been identified as having a threshold likelihood of resulting in early termination of a sequence. The command sent to the user terminals 102 may additionally or alternatively disable application execution and/or request that the user upgrade the application to a different version of the application.

A message may be sent to the application server 140 to disable downloading of the application to user terminals 102 and/or to disable or modify operation of a feature of the application to avoid occurrence of the early-terminated operational state sequence and/or avoid or reduce the likelihood of the application instance residing in the operational state that has been identified as having a threshold likelihood of resulting in early termination of a sequence.

The application analysis computer 150 can use a Markov chain model to model the operational state transition diagram of FIG. 4. The Markov chain model provides a computationally efficient process for analyzing the large number of available transitions and sequences of transitions between the operational states. Use of a Markov chain model can be particularly advantageous when the reports identify a large number of different types of operational states that an application can reside in while being processed.

Figure 5:
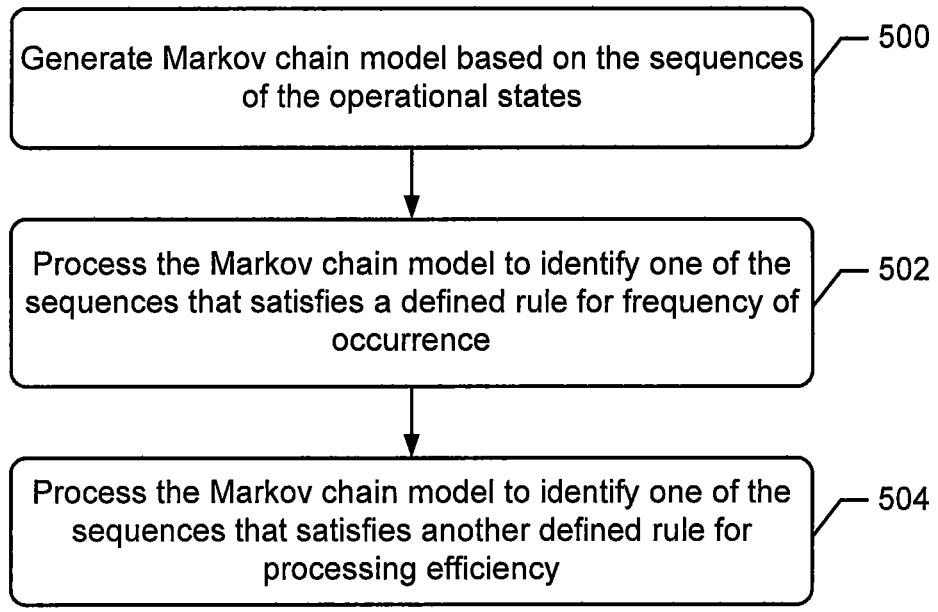
FIGS. 5-9 illustrate flowcharts of operations that may be performed by an application analysis computer to generate state predictive metrics in accordance with some embodiments of the present disclosure.

FIG. 5 is a flowchart that provides an overview of these operations that may be performed by the application analysis computer 150. Referring to FIG. 5, a Markov chain model is generated (block 500) based on the sequences of the operational states. The time duration of each state can be modeled as a state duration in the Markov chain model. The state weights can be used as weights assigned to each state in the Markov chain model.

The Markov chain model is processed (block 502) to identify one of the sequences that satisfies a defined rule for frequency of occurrence. The Markov chain model may alternatively or additionally be processed (block 504) to identify one of the sequences that satisfies another defined rule for processing efficiency, such as a sequence that minimizes the total sequence time and/or the total sequence weight between two defined operational states.

The application analysis computer 150 can analyze the Markov chain model to track and predict sequences of operational states when instances of the application programmer processed by user terminals. The Markov chain model can be used to predict or forecast occurrence of individual operational states and sequences of operational states for a defined application. The probability of a defined sequence of operational states occurring can be predicted by the application analysis computer 150, and the percent completion of various defined sequences of operational states can be estimated. Moreover the Markov chain model in combination with a Viterbi algorithm may be used to identify the most likely sequence of operational states that will be performed for a defined function and/or identify an optimal sequence of operational states to perform the defined function.

Figure 7:
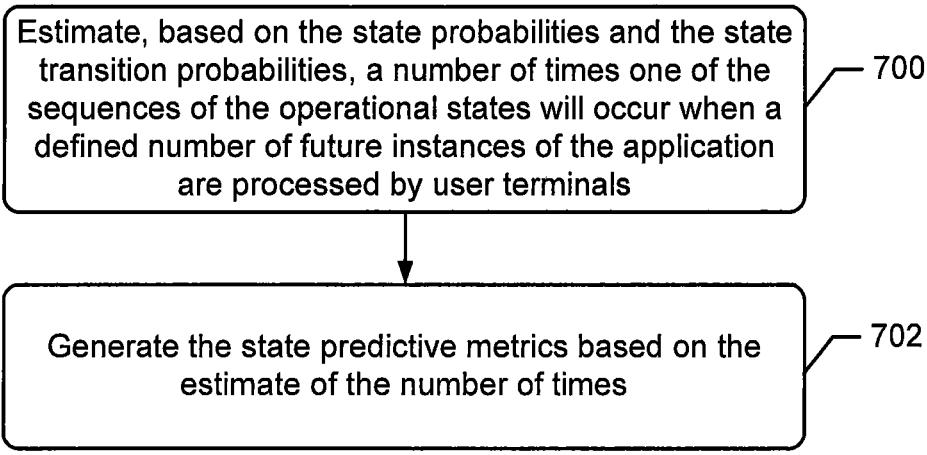

Referring to the flowchart of FIG. 7, the application analysis computer 150 may estimate (block 700), based on the state probabilities and the state transition probabilities, a number of times one or more of the sequences of the operational states will occur when a defined number of future instances of the application are processed by user terminals 102. State predictive metrics can be generated (block 702) based on the estimate of the number of times. State predictive metrics may be communicated to the application server 140 and/or may be used to control processing of the application by the user terminals 102.

Figure 10:
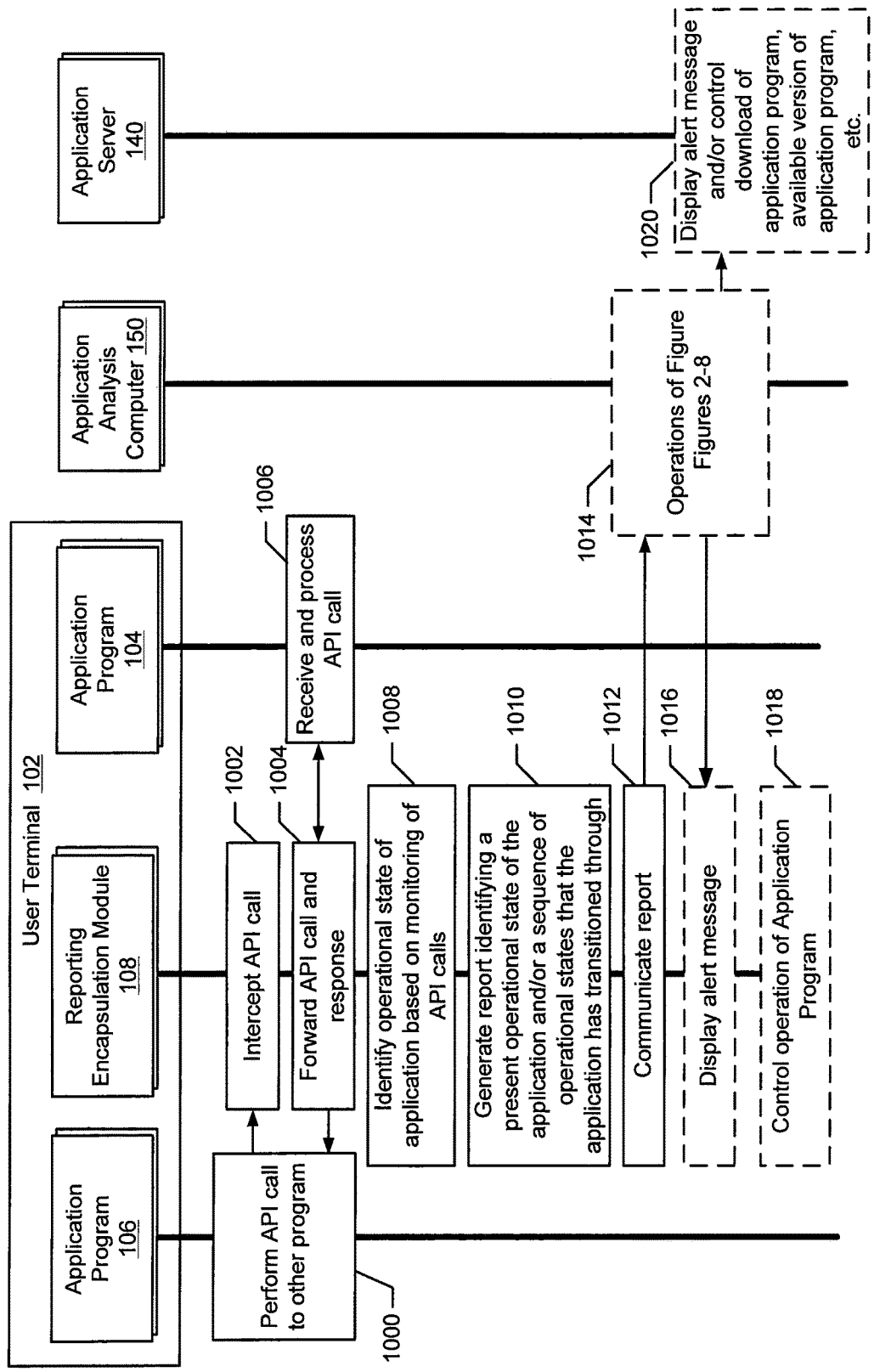
FIG. 10 is a combined data flow diagram and flowchart of operations by a user terminal, an application analysis computer, and an application server in accordance with some embodiments of the present disclosure.

FIG. 10 is a combined data flow diagram and flowchart of operations by a user terminal 102, the application analysis computer 150, and the application server 140 in accordance with some embodiments of the present disclosure.

Referring to FIG. 10, the application program 106 performs an API call (block 1000) to the other application program 104. The reporting encapsulation module 108 intercepts (block 1002) the API call. The reporting encapsulation module 108 forwards (block 1004) the API call to the other application program 104, which receives and processes (block 1006) the API call. The other application program 104 may communicate a response message which is intercepted and forwarded (block 1004) through the reporting encapsulation module 108 to the application program 106.

The reporting encapsulation module 108 identifies (block 1008) operational states of the application based on monitoring the API calls, and generates (block 1010) one or more reports identifying a present operational state of the application and/or sequence of operational states that the application has transitioned through while being processed by the user terminal 102, such as described above. The report is communicated (block 1012) toward the application analysis computer 150. The operations for identifying and generating reports may be performed continuously or repetitively according to a defined time interval. The defined time interval may vary over time responsive to occurrence of a condition defined by a rule and/or responsive to a message from the application analysis computer 150 and/or from the application server 140.

The application analysis computer 150 performs operations (block 1014) shown in one or more of FIGS. 1-9 in accordance with some embodiments. The application analysis computer 150 may communicate an alert message to the user terminal 102, and the user terminal 102 may display (block 1016) a notification on a display device of the user terminal 102 based on content of the alert message and/or may control (block 1018) processing of the application program 106 and/or the application program 104 responsive to content of the alert message. The application analysis computer 150 may alternatively or additionally communicate an alert message to the application server 140, which may display (block 1020) the notification on display device of the application server 140 and/or control (block 1020) downloading of the application program, control which version of the application program is available for downloading, disable operation of a feature of the application program, etc, such as described above.

Example User Terminal and Application Analysis Computer

Figure 11:
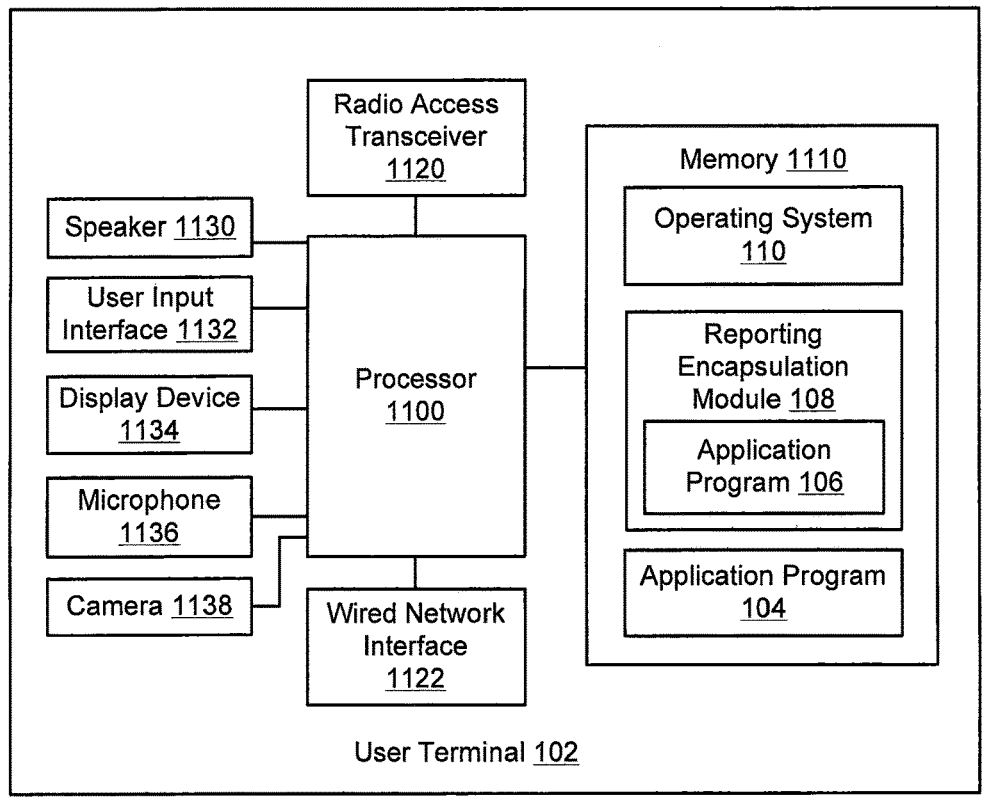
FIG. 11 is a block diagram of a user terminal configured according to some embodiments of the present disclosure.

FIG. 11 is a block diagram of a user terminal 102 configured according to some embodiments of the present disclosure. Referring to FIG. 11, the user terminal 102 includes a processor 1100, a memory 1110, and a network interface which may include a radio access transceiver 1120 and/or a wired network interface 1122 (e.g., Ethernet interface). The radio access transceiver 1120 can include, but is not limited to, a LTE or other cellular transceiver, WLAN transceiver (IEEE 802.11), WiMax transceiver, or other radio communication transceiver configured to communicate with the application analysis computer 150 via a radio access network.

The processor 1100 may include one or more data processing circuits, such as a general purpose and/or special purpose processor, such as a microprocessor and/or digital signal processor. The processor 1100 is configured to execute computer program code in the memory 1110, described below as a non-transitory computer readable medium, to perform at least some of the operations described herein as being performed by a user terminal. The computer program code may include an operating system 110, a plurality of application programs 104 and 106, and an reporting encapsulation module 108. The reporting encapsulation module 108 when executed by the processor 1100 causes the processor 1100 to perform operations in accordance with one or more embodiments disclosed herein. The user terminal 102 may further include a speaker 1130, a user input interface 1132 (e.g., touch screen, keyboard, keypad, etc.), a display device 1134, a microphone 1136, and a camera 1138. As used herein, the term "user terminal" may include a cellular radiotelephone, satellite radiotelephone, a gaming console, a smart appliance, a tablet computer, a laptop computer, and/or a desktop computer.

Figure 12:
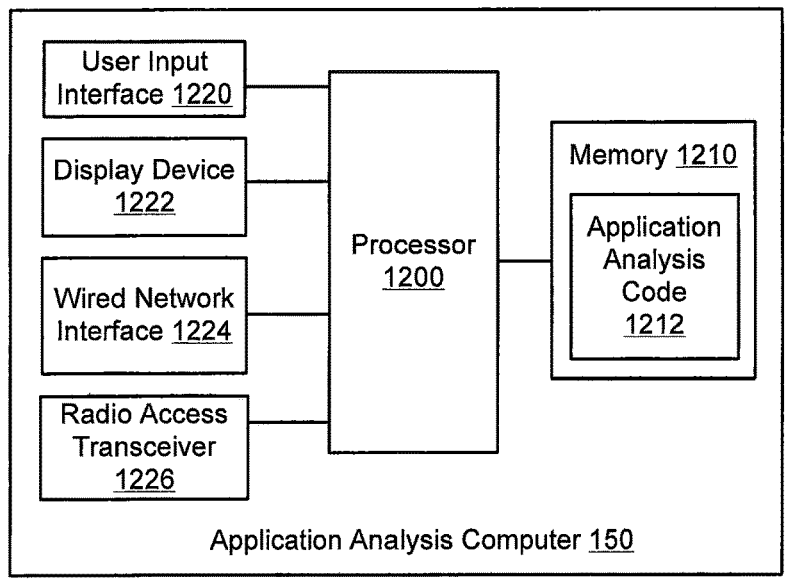
FIG. 12 is a block diagram of an application analysis computer configured according to some embodiments of the present disclosure.

FIG. 12 is a block diagram of an application analysis computer 150 configured according to some embodiments of the present disclosure. The application analysis computer 150 includes a processor 1200, a memory 1210, and a network interface which may include a radio access transceiver 1226 and/or a wired network interface 1224 (e.g., Ethernet interface). The radio access transceiver 1226 can include, but is not limited to, a LTE or other cellular transceiver, WLAN transceiver (IEEE 802.11), WiMax transceiver, or other radio communication transceiver configured to communicate with the user terminal 102 via a radio access network.

The processor 1200 may include one or more data processing circuits, such as a general purpose and/or special purpose processor (e.g., microprocessor and/or digital signal processor) that may be collocated or distributed across one or more networks. The processor 1200 is configured to execute computer program code in the memory 1210, described below as a non-transitory computer readable medium, to perform at least some of the operations described herein as being performed by an application analysis computer. The computer program code may include application analysis code 1212 that when executed by the processor 1200 causes the processor 1200 to perform operations in accordance with one or more embodiments disclosed herein for the application analysis computer 150. The application analysis computer 150 may further include a user input interface 1220 (e.g., touch screen, keyboard, keypad, etc.) and a display device 1222.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer program product, comprising:
   a non-transitory computer readable storage medium comprising computer readable program code embodied in the medium that when executed by a processor of an application analysis computer causes the processor to perform operations comprising:
   obtaining reports from user terminals, the reports identifying operational states of instances of an application being processed by the user terminals;
   identifying sequences of the operational states that the instances of the application have transitioned through while being processed by the user terminals;
   identifying common operational states that occur in a plurality of the sequences;
   for each of the common operational states, determining a frequency of occurrence of the common operational state;
   for each state transition between the common operational states in the sequences, determining a frequency of occurrence of the state transition;
   generating state predictive metrics based on the frequencies of occurrence of the common operational states and the frequencies of occurrence of the state transitions, the generating comprising:
   determining state probabilities based on the frequencies of occurrence of the common operational states;
   determining state transition probabilities based on the frequencies of occurrence of the state transitions; and
   generating the state predictive metrics based on the state probabilities and the state transition probabilities;
generating a command to control execution of the application by the user terminals based on the generated state predictive metrics; and
communicating the command to the user terminals, wherein the command comprises an instruction that causes the user terminals to one of disable execution of the application at the user terminals or modify an operation of the application at the user terminals to cause the user terminals to not process a particular sequence of the plurality of the sequences of the operational states which has caused processing errors when processed by processors of the user terminals.

2. The computer program product of claim 1, wherein the operations further comprise:
   communicating an instruction to an application server that causes the application server to one of disable downloading of the application to the user terminals and/or modify an operational feature of the application to cause the user terminals to not process the particular sequence of the plurality of the sequences of the operational states which has caused processing errors when processed by processors of the user terminals.

3. The computer program product of claim 1, wherein the operations further comprise:
   estimating, based on the state probabilities and the state transition probabilities, a number of times one of the sequences of the operational states will occur when a defined number of further instances of the application are processed by user terminals; and
   generating the state predictive metrics based on the estimate of the number of times,
   wherein generating the command to control execution of the application by the user terminals based on the generated state predictive metrics is further based on the estimate of the number of times, to cause the number of times one of the sequences of the operational states will occur to be reduced.

4. The computer program product of claim 1, wherein the operations further comprise:
   identifying an early-terminated sequence of the operational states that did not reach a defined operational state before instances of the application terminated processing;
   generating, based on the state probabilities and the state transition probabilities relating to the early-terminated sequence of the operational states, a statistical probability that the early-terminated sequence of the operational states will occur when further instances of the application are processed by user terminals; and
   wherein generating the command comprises generating the command when the statistical probability satisfies a defined threshold value.

5. The computer program product of claim 1, wherein the determining state transition probabilities based on the frequencies of occurrence of the state transitions, comprises:
   assigning a threshold state transition probability to any operational states that have not been identified as occurring in the plurality of the sequences.

6. The computer program product of claim 1, wherein the determining state transition probabilities based on the frequencies of occurrence of the state transitions, comprises:
   for each of the common operational states, identifying any other operational states that are subsequently transitioned to from the common operational state and counting occurrences of transitions from the common operational state to each of the any other operational states;
   determining the state transition probabilities based on the counted occurrences.

7. The computer program product of claim 1, wherein the operations further comprise:
   determining operational state durations based on content of the reports, each of the operational state durations indicating a time duration during which one of the instances of the application remained within one of the operational states;
   generating the state predictive metrics based on the operational state durations, the state probabilities, and the state transition probabilities.

8. The computer program product of claim 7, wherein the generating the state predictive metrics based on the operational state durations, the state probabilities, and the state transition probabilities, comprises:
   determining probability time metrics for the sequences of the operational states based on a combination of the operational state durations, the state probabilities, and the state transition probabilities; and
   generating the state predictive metrics based on the probability time metrics.

9. The computer program product of claim 8, wherein the operations further comprise:
   identifying one of the sequences of the operational states having a probability time metric that satisfies a defined rule; and
   selectively communicating the command based on the probability time metric of the one of the sequences of the operational states satisfying the defined rule.

10. The computer program product of claim 8, wherein the operations further comprise:
    ranking the sequences of the operational states based on the probability time metrics for the sequences of the operational states.

11. The computer program product of claim 8, wherein the operations further comprise:
    obtaining weight values for the operational states;
    combining the weight values for the operational states with the state transition probabilities and the state probabilities to generate weighted metrics; and
    determining the probability time metrics for the sequences of the operational states based on a combination of the weighted metrics, the operational state durations, the state probabilities, and the state transition probabilities.

12. The computer program product of claim 11, wherein the obtaining weight values for the operational states, comprises:
    querying a repository containing weight values of operational states of a plurality of applications using an identifier for the application to obtain the weight values for the operational states of the application.

13. The computer program product of claim 8, wherein the operations further comprise:
    identifying an early-terminated sequence of the operational states that did not reach a defined operational state before instances of the application terminated processing by user terminals; and selectively communicating the command based on identification of the early-terminated sequence of the operational states that did not reach the defined operational state.

14. The computer program product of claim 1, wherein the command comprises an instruction that causes the user terminals to disable execution of the application to cause the user terminals to not process the particular sequence of the plurality of the sequences of the operational states which has caused processing errors when processed by processors of the user terminals.

15. The computer program product of claim 1, further comprising:
determining, based on the generated state predictive metrics, that one of disabling execution of the application at the user terminals or modifying the operation of the application at the user terminals will prevent the application from transitioning through a particular sequence of the plurality of the sequences of the operational states; and
determining, based on the generated state predictive metrics, that prevention of the application from transitioning through the particular sequence of the plurality of the sequences of the operational states will cause a reduction in one of processing resource consumption or processing delay by the application,
wherein generating the command comprises generating the command when the reduction in one of processing resource consumption or processing delay by the application satisfies a defined threshold value.

16. A method comprising:
performing operations as follows on a processor of an application analysis computer:
obtaining reports from user terminals, the reports identifying operational states of instances of an application being processed by the user terminals;
identifying sequences of the operational states that the instances of the application have transitioned through while being processed by the user terminals;
identifying common operational states that occur in a plurality of the sequences;
for each of the common operational states, determining a frequency of occurrence of the common operational state;
for each state transition between the common operational states in the sequences, determining a frequency of occurrence of the state transition;
generating state predictive metrics based on the frequencies of occurrence of the common operational states and the frequencies of occurrence of the state transitions, the generating comprising:
determining state probabilities based on the frequencies of occurrence of the common operational states;
determining state transition probabilities based on the frequencies of occurrence of the state transitions; and
generating the state predictive metrics based on the state probabilities and the state transition probabilities;

generating a command to control execution of the application by the user terminals based on the generated state predictive metrics; and
communicating the command to the user terminals, wherein the command comprises an instruction that causes the user terminals to one of disable execution of the application at the user terminals or modify an operation of the application at the user terminals to cause the user terminals to not process a particular sequence of the plurality of the sequences of the operational states which has caused processing errors when processed by processors of the user terminals.

17. The method of claim 16, wherein the determining state transition probabilities based on the frequencies of occurrence of the state transitions, comprises:
for each of the common operational states, identifying any other operational states that are subsequently transitioned to from the common operational state and counting occurrences of transitions from the common operational state to each of the any other operational states;
determining the state transition probabilities based on the counted occurrences, and
wherein generating the command to control execution of the application by the user terminals based on the generated state predictive metrics is further based on the counted occurrences.

18. The method of claim 16, wherein the operations further comprise:
determining operational state durations based on content of the reports, each of the operational state durations indicating a time duration during which one of the instances of the application remained within one of the operational states;
generating the state predictive metrics based on the operational state durations, the state probabilities, and the state transition probabilities.

19. The method of claim 18, wherein the operations further comprise:
obtaining weight values for the operational states;
combining the weight values for the operational states with the state transition probabilities and the state probabilities to generate weighted metrics; and
determining the probability time metrics for the sequences of the operational states based on a combination of the weighted metrics, the operational state durations, the state probabilities, and the state transition probabilities.

20. The method of claim 16, wherein the operations further comprise:
communicating an instruction to an application server that causes the application server to one of disable downloading of the application to the user terminals and/or modify a feature of the application to cause the user terminals to not process the particular sequence of the plurality of the sequences of the operational states which has caused processing errors when processed by processors of the user terminals.

* * * * *